Aug. 12, 1958   J. W. DUNNING ET AL   2,847,282
COUNTERCURRENT EXTRACTION APPARATUS
Filed Nov. 12, 1954   4 Sheets-Sheet 1
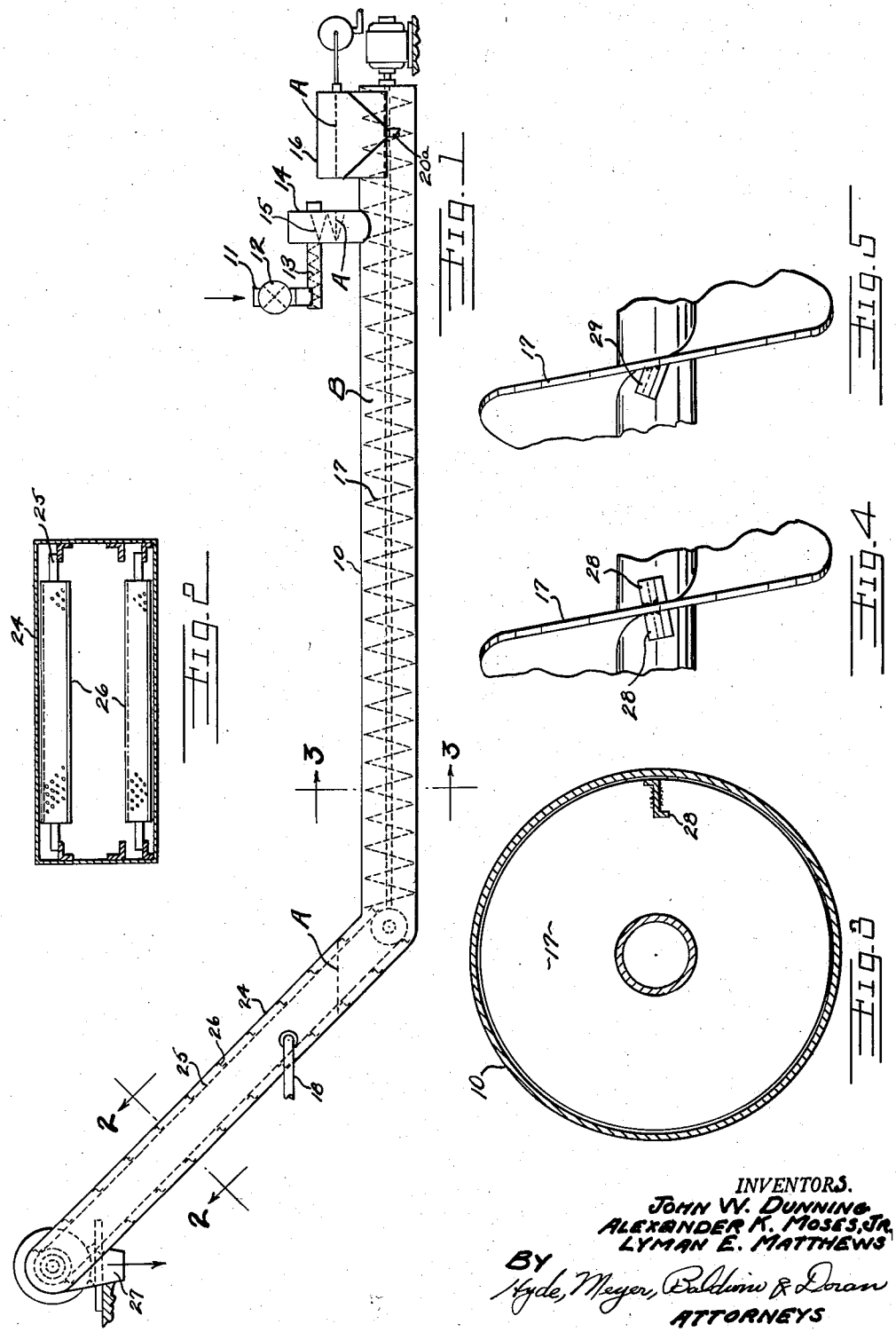
INVENTORS.
JOHN W. DUNNING
ALEXANDER K. MOSES, JR.
LYMAN E. MATTHEWS
BY
Hyde, Meyer, Baldwin & Doran
ATTORNEYS Aug. 12, 1958  J. W. DUNNING ET AL  2,847,282
COUNTERCURRENT EXTRACTION APPARATUS
Filed Nov. 12, 1954  4 Sheets-Sheet 2
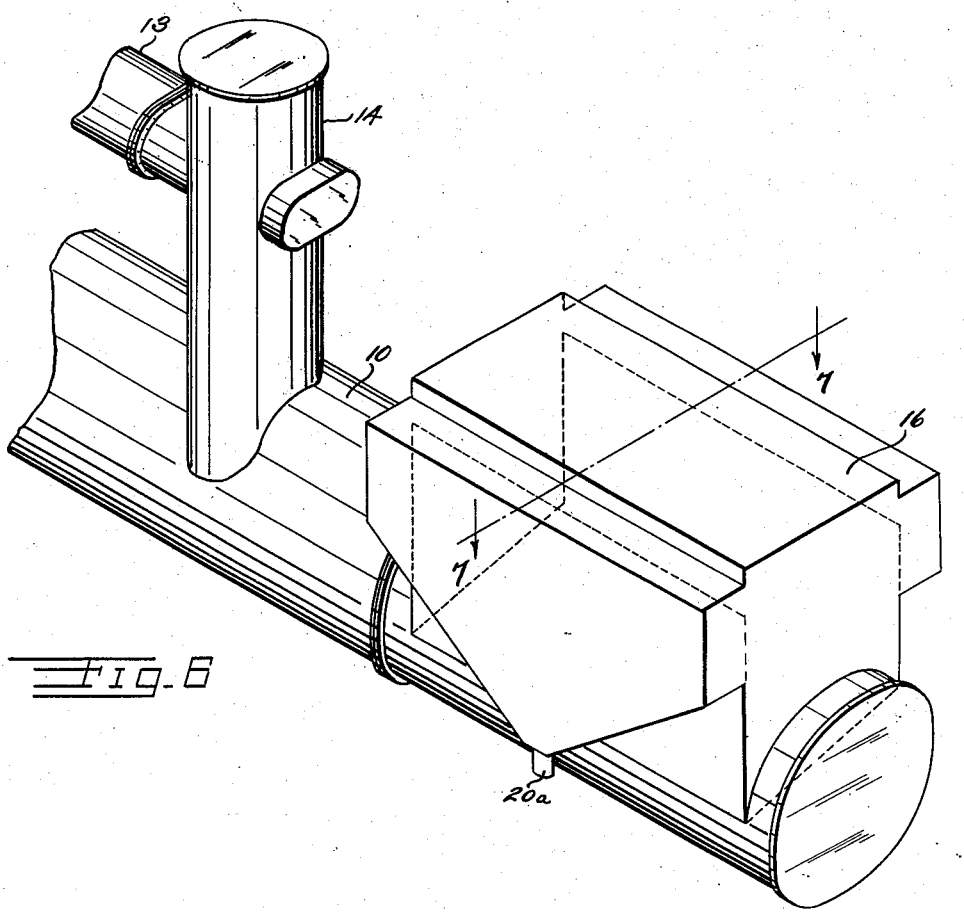
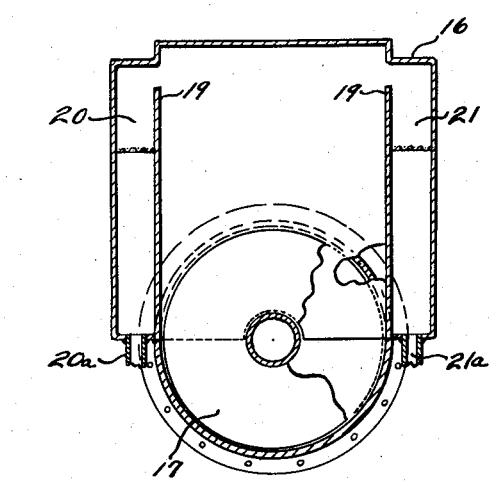
INVENTORS.
JOHN W. DUNNING
ALEXANDER K. MOSES, JR.
LYMAN E. MATTHEWS
BY
Hyde, Myers, Baldwin & Doran
ATTORNEYS

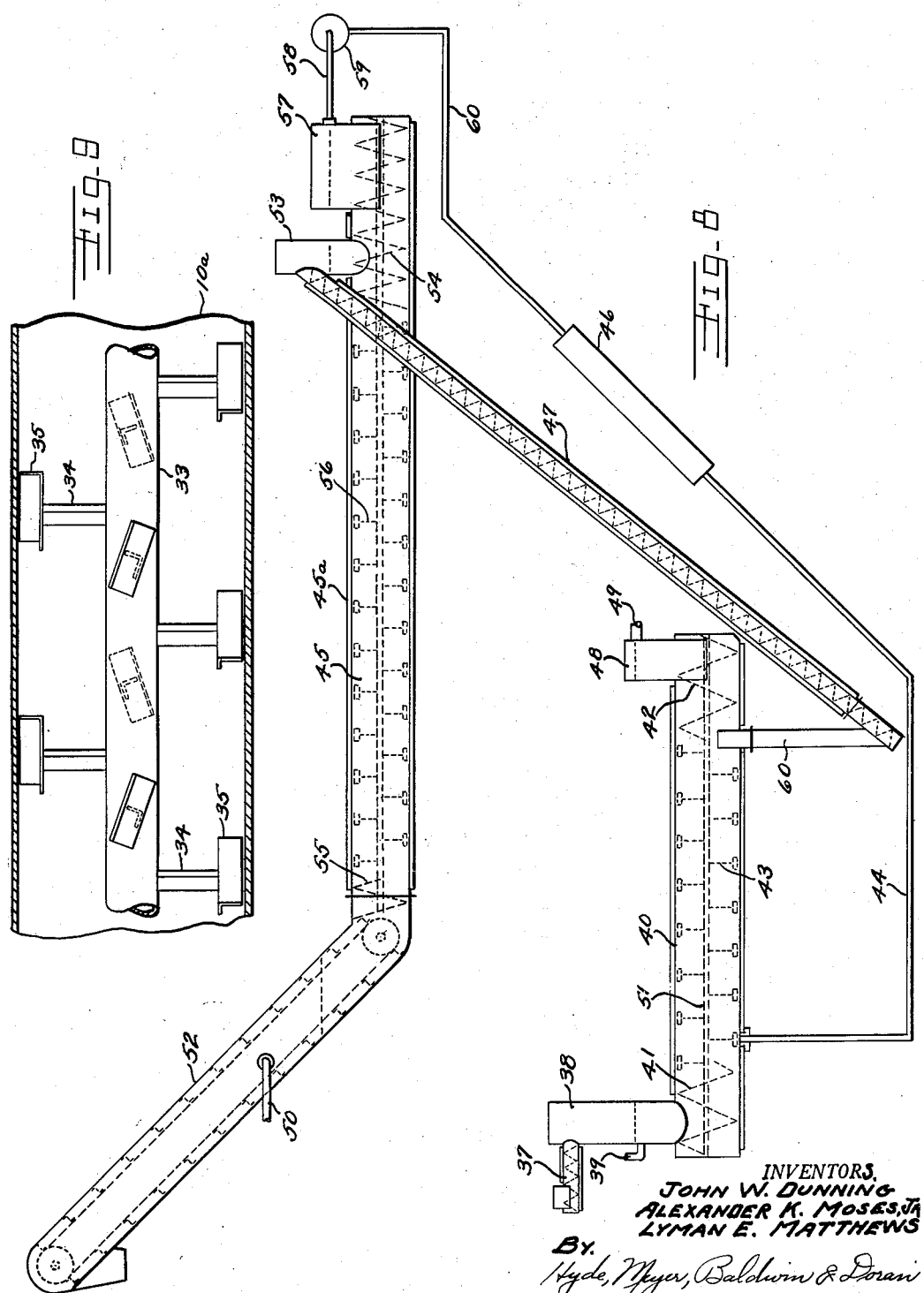

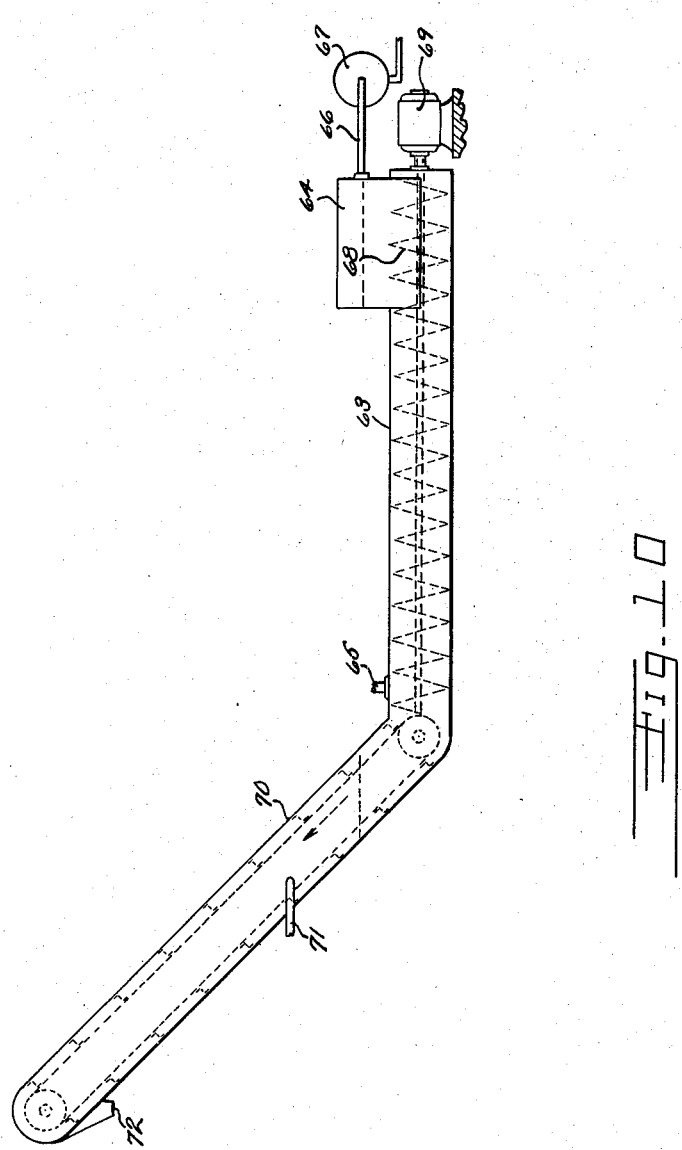

United States Patent Office 2,847,282
Patented Aug. 12, 1958

2,847,282

COUNTERCURRENT EXTRACTION APPARATUS

John W. Dunning, Lakewood, Alexander K. Moses, Jr., Elyria, and Lyman E. Matthews, Lakewood, Ohio, assignors, by mesne assignments, to International Basic Economy Corporation, New York, N. Y., a corporation of New York Application November 12, 1954, Serial No. 468,216

8 Claims. (Cl. 23—270)

The invention relates to methods and apparatus for the extraction of removable fractions, solid or liquid, from extractable materials. It particularly relates to such extraction wherein the recovery of said fractions is achieved, at least in substantial part, by subjecting said materials to the leaching effect of solvents in a novel and improved manner.

Prior art practices have comprised two main types of solvent extraction. One may be termed the "percolation" type wherein a so-called basket, or container of liquid-permeable structure is subjected to a flow therethrough of solvent liquid. Such baskets were usually stacked in a vertical tower, with the solvent percolating downward successively through each basket in the stack and with the material acting as a self-filtering medium. In this type of operation it was quite difficult to achieve thorough and even leaching since the soggy material tended to pack, and the solvent channeled by the easiest haphazard routes therethrough, or sometimes the solvent could not get through at all, and flooded the baskets. In addition, if a solid containing any appreciable degree of fine material, for example material which passes a 50 mesh to 100 mesh screen, is extracted in a Bollman type extractor, a great quantity of fines may wash through the bottom of the basket and cause insurmountable difficulties in the removal or reclamation of the fines. Further, since the basket type of extractor is of the percolation or wash type, it requires a relatively long time to accomplish the extraction of the extractable fraction from the solids.

The second type of extraction apparatus may be characterized as the totally submerged type, exemplified by the Anderson vertical column extractor which is fully shown and described in U. S. Letters Patent No. 2,588,070, granted March 4, 1952, to Raymond T. Anderson. This type provides a mild agitation of the solids being carried through the liquid extraction medium. This mild agitation under total submergence conditions furnishes a more rapid extraction of the extractable fractions than can be achieved by the basket type extractor. The vertical total submergence extractor, however, can operate efficiently only on particles of a specified size, or flakes which do not contain any appreciable amount of fines. If an appreciable amount of fines, for example material passing 100 mesh, is present, these fines tend to float on top of the miscella and thus to be carried away by the miscella leaving the extraction unit. The resulting filter problem is labor consuming, and adds to the cost of the saleable product.

An object of the present invention is to provide an apparatus for, and a method of, extraction which avoids the necessity of certain preliminary preparation steps hitherto required in extraction by means of either the basket type or the total submergence type.

A further object of the present invention is to provide an apparatus and a method adapted to handle solid material, the greater portion of which will pass a 50 mesh to 100 mesh screen.

A further object of the invention is to provide an apparatus and method as aforesaid which yields all the advantages of the vertical total submergence extractor, with mild agitation, but wherein only a very limited amount of fines escapes from the extractor with the miscella.

A further object of the invention is to provide an apparatus and method whereby materials which cannot be economically processed by the methods and apparatus heretofore known, can now be extracted efficiently.

Further objects and advantages will be obvious to those skilled in the art upon a consideration of the following specification, in conjunction with the accompanying drawings, in which:

Fig. 1 is a side elevational view, schematic in character, showing a novel apparatus suitable for the practice of our inventive method.

Figs. 2 and 3 are sectional views taken respectively on the lines 2—2 and 3—3 of Fig. 1, and somewhat enlarged.

Figs. 4 and 5 are detail plan views showing particular features of our invention.

Fig. 6 is a somewhat modified embodiment of extraction chamber.

Fig. 7 is a vertical sectional view taken on the line 7—7 of Fig. 6.

Fig. 8 is a side elevational view of another embodiment of our invention.

Fig. 9 is a fragmentary view, somewhat enlarged, showing internal structure of part of the apparatus shown in Fig. 8.

Fig. 10 shows an additional embodiment of the invention which may be used in combination with the apparatus shown in Figs. 1 or 8, or with any related apparatus from which fines-bearing miscella is being discharged.

Referring first to Figs. 1 to 7, there is shown a horizontal extraction chamber 10 of generally cylindrical shape. Material to be treated with solvent liquid is dropped into a vertical feed chute 11 containing a rotating seal 12. The material is thence conveyed by a horizontal feeder screw 13 to a vertical inlet chamber 14 in which means, here indicated at 15, is provided for immersing the material beneath the liquid level, shown in Fig. 1 at A, A, A. Immersion in the liquid cushions the fall of the material, and care should be taken to avoid too much turbulence in and beneath the inlet chamber 14. Any undue agitation will prevent proper operation in the settling chamber 16 later to be described.

A helical screw 17 is provided in extraction chamber 10, suitably oriented so as to advance the material to the left (Fig. 1). At the same time solvent liquid is continuously admitted through pipe 18 to maintain the liquid level at A, and to cause a continuous flow of solvent to the right, and over the overflow baffle plates or weirs 19 (Fig. 7) in settling chamber 16. Said weirs 19 extend longitudinally along the length of chamber 16 to provide two side discharge chambers 20 and 21 into which the miscella flows. Taking as an example the extraction of oil from cottonseed, the miscella (mixture of oil and solvent) carrying a certain amount of entrained fines, rises slowly in chamber 16 while the fines settle to the bottom and are conveyed to the left by screw 17. The clarified miscella flows over weirs 19 and downwardly in the chambers 20 and 21, leaving through pipes 20a and 21a to flow to separation means (not shown) where the oil and solvent are separated. Thus the top edge of the weirs 19 establishes the liquid level for the apparatus.

At the left end of the extraction chamber 10 (Fig. 1) the extracted solid material is lifted through an inclined elevator chamber 24 by means of an endless conveyor 25 carrying spaced perforated scraper plates 26 (Fig. 2). The material is discharged through a discharge spout 27 whence it goes to driers.

It will be apparent, from the description so far, that the oil-rich fresh material, at its point of entry to the solvent liquid, falls through a column of extraction solvent partially enriched with the oil being extracted. Thus, prior to the miscella leaving the extraction vessel it is further enriched with the more readily extractable oil from the seed as the miscella leaves the extraction vessel.

Beginning about one-fourth of the distance from the inlet chamber 14 to the end of the extraction chamber 10 at about the point B, we have provided lifting plates 28 secured at spaced points to the helical screw flights. The transverse area of the lifting plates may be varied to suit the physical characteristics of the material being treated, because, as the material increases in density, it has a greater tendency to settle, and to be merely scraped along the bottom of chamber 10. It becomes desirable therefore to increase the transverse area of the plates when the occasion requires, to oppose the settling tendency, and mix the solid with the countercurrent stream of solvent. The number of the lifting plates may also be increased.

When more thorough mixing of the solids is required, lifter plates such as shown at 29, Fig. 5, may be inserted between adjacent sets of plates 28. The angular orientation of respective plates relative to each other may be utilized to move the material forwardly as well as to elevate the material and drop it through the level of extraction solvent.

In the elevator chamber 24, the portion above liquid level A serves as a drain vessel. As the solid residue begins to move up the incline in elevator 24, it is subjected to the leaching action of fresh solvent which removes the final traces of oil.

As heretofore indicated, the settling chamber 16 occupies the right end of the extraction chamber 10. It permits settling and removal of solid particles from the miscella. Extension of the screw helices 17 into the bottom of the settling chamber permits the removal of settled material, such settled material being carried along with the fresh material entering the extraction chamber. The arrangement is particularly favorable to the processing of material such as copra, which responds very poorly to attempts at filtration. Copra has light fines, and the filter cake is not stable enough to hold its form, but it crumbles and produces a slurry in the bottom of the filter chamber. In the present solvent plants this slurry cannot be handled due to fines stopping up the system if they are allowed to go with the miscella. If on the other hand the fines are put back into the extractor, in systems operated under prior art practices, the fines will again accumulate in the filters until the whole system is overloaded.

One of the reasons why the present system is so efficient is that the helical worm flights at the right end of the extraction chamber include one or more complete turns between the lower end of the vertical inlet chamber 14 and the settling chamber 16. This means that, for example, when cottonseed is being extracted, the miscella must follow a tortuous path around the helical worm 17 in order to reach the settling chamber. The worm is revolving at less than 2 R. P. M. and the miscella has a flow rate of from 0.01 to 0.05 inch per second. Furthermore the miscella must go down below the helical screw hub in the flooded extraction chamber 10 in order to reach the settling chamber 16. Consequently any lighter particles, which rise in the liquid, are not carried to the settling chamber and this is one of the novel features of the present invention.

The substantial longitudinal extent of the overflow weir plates 19, in conjunction with the low rate of miscella flow, effects a minimum of disturbance in the settling chamber 16.

Fig. 9 shows a somewhat modified embodiment of the present invention. It is used with an assembly which is otherwise identical to that shown in Figs. 1 to 7. When extracting solids of great density a portion of the midsection of the extraction chamber, here designated as 10a includes a shaft 33 which carries, in spaced helical arrangement, a plurality of lifting paddles each comprising a radial arm 34 and an impeller paddle 35 at its outer end. The shaft 33, at its ends, has helical screw flights, the arrangement being as shown, for example, in Fig. 8, vessel 45 and screw flights 54 and 55, later to be described. The impellers are all oriented in such a way as to gradually advance the material towards the discharge end of the extraction chamber. A construction such as shown in Fig. 9 is appropriate for material having a density, for example, of 75 to 125 pounds per cubic foot. A combination of the simple helical screw with a paddle section solves certain problems encountered with a screw alone. With the helical screw the solvent tends to flow over the top of the material being conveyed in countercurrent relationship, so that the solvent has only inadequate contact with the solid since the screw does not sufficiently agitate material of high density or finely divided solids which pack and settle.

We have made tests, using a simple helical screw, on material weighing about 90 pounds per cubic foot, and also on material containing appreciable amounts of fines, for example material in which 40 percent passed 100 mesh. The extraction capabilities of this arrangement were quite unsatisfactory. When we used a shaft having helical flights in combination with impeller paddles the results were very greatly improved.

The angle of each impeller paddle with respect to the shaft must be adequate to prevent reverse flow of the material with the solvent. In general, the angle of the impeller (which serves both as a lifting member and an advancing member) should have approximately the same angle with respect to the shaft as the helix angle of the helical flights at the opposite ends of the shaft.

Fig. 8 illustrates another novel embodiment of the invention which is particularly adapted for the extraction of a solid fraction, such as the extraction of sulphur from its ores. It will be particularly described in this latter connection.

The extraction of native sulphur from its ores presents difficult problems because of the high density of the original ore, the fines in the granulated ore, the solubility characteristics of the native sulphur, and the low solubility of the crystalline sulphur once it crystallizes from the extraction medium.

Referring to Fig. 8 the solid material to be extracted, in this case a sulphur gypsum ore, is fed by means of the horizontal feeder screw 37 into a vertical inlet chute 38, and simultaneously a sufficient amount of pre-heated solvent from the sulphur crystallizer is added in concurrent relationship, for example through pipe 39. The primary extraction chamber 40 has screw flights 41 and 42 at each end, and in its mid portion it has paddle impellers 43 identical with those heretofore described. During travel of the ore and solvent to the right in chamber 40 the ore, in contact with the preheated solvent, may or may not exceed the temperature at which sulphur melts, and simultaneously a fractional-strength miscella, herein termed "half-miscella" is added by means of pipe 44. This half-miscella originates in extractor 45 soon to be described, and is preheated by any suitable type heater 46. Under the existing temperature and solvent conditions the dissolved sulphur will not crystallize because all the sulphur goes rapidly into solution under these conditions of temperature and amount of solvent, and the addition of the weak half-miscella insures the maintenance of the solution. The solids, from which a major portion of the sulphur has been extracted, drop through a pipe 60 near the right end of chamber 40 to an elevator conveyor 47. The concentrated miscella (full miscella)

passes through a settling chamber 48 similar to the chamber 16 of Fig. 7, and through a pipe 49 to sulphur crystallizers (not shown) and the sulphur is removed by filtration. The shaft 51 extends into the bottom of settling chamber 48, and at the right end thereof carries one or more helical screw flights 42 which are opposed in orientation to flight 41 so that material settling in chamber 48 travels to the left towards and into pipe 60 and thence to elevator 47. The residual solvent, saturated at room temperature with sulphur, is recycled to the concurrent extractor chamber 38 by means of pipe 39.

The partially extracted solid rises in elevator 47 and enters through a feed chute 53 into the leaching chamber 45, steam jacketed at 45a in which chamber it proceeds to the left under the impulse of the screw flights 54 and 55 and the impeller paddles 56 such as shown in Fig. 9. In countercurrent relationship thereto preheated solvent admitted through pipe 50 from dryers not shown flows to the right and eventually into the settling chamber 57, and thence through pipe 58 and pump 59 to pipe 60, heater 46 and pipe 44 as heretofore mentioned. Substantially all of the sulphur is taken from the ore residue in chamber 45.

Fig. 10 shows a novel and improved settling chamber adapted to accept the liquid miscella output, for example, from outlet pipes 20a and 21a of the apparatus shown in Figs. 1, 6 and 7, or from outlet pipe 49 in Fig. 8. It comprises an additional unit in which a horizontal conveyor chamber 63 has a settling chamber 64 at the end thereof, this chamber being similar to the settling chambers previously described. Miscella with entrained fines enters at 65 and flows towards chamber 64, where the fines settle gradually, the clarified miscella leaving by pipe 66 and through pump 67. Settled fines travel to the left, urged by the helical screw flights 68 driven by motor 69. At the left end of the settling chamber 63 the fines are carried upwardly through the wash and drainage elevator 70 in which elevator the fines are washed by a solvent spray 71. The liquid component of the fines drains rearwardly into chamber 63. The settled, washed, and drained fines are carried out through spout 72.

The following examples may be cited to demonstrate the advantages of the invention just described.

*Example I.*—A corn germ by-product material contained approximately 8% corn oil and a relatively high percentage of finely divided starch. Forty-four percent of the corn germ by-product material passed a 100 mesh screen and 23% passed a 200 mesh screen. Sixty-five pounds per hour of the corn germ by-product material as received at 8% moisture was conveyed to the feed section of the extractor illustrated in Figure 1. Hexane at a temperature of 140° F. was pumped at a ratio of 2:1 by weight of the by-product material to the solvent inlet 18 of the extractor. The extracted meal is conveyed to desolventizing dryers where the remaining hexane was removed from the extracted germ. The extracted germ meal, upon analysis, contained .26% residual oil. The miscella from the miscella chamber contained on an average .9% fines. This amount of fines is such that standard filtration equipment may be employed for removal of these fines from the miscella.

As an example of the value and specific nature of the lifting flights 28 and 29 on the helix in the extractor section, the above corn germ by-product material was processed in the same above mentioned extractor, except no lifting flights were secured to the helix in the extraction chamber. All other conditions being equal, the residual oil in the corn germ extracted meal increased seven-fold. Instead of approximately 96% of the oil being extracted as was the case in the above example, only approximately 80% was extracted when no lifting flights were employed. In another similar test, the number of flights as used in the above example were employed on the helix in the extraction section of the extraction vessel, however these flights were secured to the helix in a plane horizontal to the centrally located shaft so that the lifting flights had no forward carrying capacity. In processing the corn germ by-product material with the extractor shown in Figure 1, made up as described, the corn germ material failed to advance through the extractor section and thereby forced a shut down of the unit. We, therefore, determined that it was necessary that the lifting flights be properly disposed on the helix in the extraction chamber and be given a proper pitch, depending upon the density of the material being extracted, in order that efficient and continuous extractions may be carried out.

*Example II.*—Rice bran is a raw material similar to the above described corn germ by-product material in that it is a finely divided, relatively low oil content material. Rice bran, however, is not as finely divided as the above described corn germ by-product. It is impossible to extract rice bran in known percolator type extractors. There are a few operations wherein the oil from rice bran is extracted in a vertical column, totally submerged extractor unit. In these units, however, extreme caution in preparation must be observed in order not to obtain a miscella so heavy with fines that the operation is uneconomical. Special centrifugals and filters have been used with this type of extraction in order to eliminate the fines from the miscella stream. Rice bran, however, when processed in the extractor designed according to the present invention, furnishes miscellas containing less than .8% fines so that standard filtration equipment adequately removes the fines from the miscella and permits an efficient and economical operation wherein the oil is separated from the solid material.

*Example III.*—Douglas fir bark contains from 4 to 9% wax, which has a commercial value in the hard wax polish field. Douglas fir bark, however, upon grinding for solvent extraction contains about 3% by weight of a very finely divided material, which washes through the basket or percolation type of extractor. In addition, the bark contains several percent of a cork like substance that floats on top of miscellas so that in known submerged extractors this cork material, as well as the above mentioned fines are removed from the extractor with the miscella. When processing this type of material in the extractor according to the present invention, it is possible to convey both the cork and fines from the miscella settling chamber, as well as provide a means of mildly agitating the bark, cork and fines during the extraction step, so that 95% recovery of wax from the bark is possible. By a simple filtration of the wax solvent miscella, the .2 to .4% fines in the miscella may be removed so that the wax may be crystallized from the previously concentrated miscella.

*Example IV.*—A sulphur bearing gypsum ore containing approximately 30% sulphur, as described above, may be extracted in the equipment shown in Figure 8 with almost 100% separation of sulphur from the gypsum ore. The amount of fines leaving the miscella settling chamber with the miscella are of such a low order that filtration of the miscellas is not necessary to obtain subsequently crystallized sulphur of 99.5% purity.

*Example V.*—Pyrethrum flowers have been extracted in batch type extractors because of the high amount of fines in the flowers when the same are ground prior to solvent extraction. In one case, pyrethrum flowers were extracted in a prior art type extractor known as Ford type extractor with an attendant high solvent loss and poor recovery of pyrethrum, the latter poor results being due to inefficient contact of the extracting medium with the ground flowers to be extracted. Pyrethrum flowers ground through a 1/8 mesh screen in a hammer mill, which furnishes a finely divided material approximately 20% of which will pass 100 mesh screen, are successfully extracted in the extractor according to the present invention. Better than 90% of the pyrethrum may be extracted from the flowers, leaving a residual pyrethrum content in the extracted flowers in the order of .08%. Again, in this instance, standard filtration equipment may be used to remove the few tenths percent of fines in the miscella prior to pyrethrum recovery and purification.

*Example VI.*—During the last 10 years, considerable experimentation has been conducted on the extraction of oil from cottonseed meats. The initial developments in the United States in this field were guided toward the direct extraction of oil from the meats. Both the Bollman type and total submerged column type of extractor were used in the early commercial operations. The submerged column type of extractor failed to give efficient extractions when operating at reasonable capacity through the extractors. In one instance, extracted meals issuing from the extraction equipment contained 2 to 2½% oil. Although the Bollman type extractors are still in operation on the recovery of oil from cottonseed meats, the operation of this type of extractor limits the mode of preparation of the meats prior to extraction. Cottonseed meats contain a substance known as gossypol, which is most effectively removed from cottonseed meats by cooking at 12 to 18% moisture at 185 to 205° F., as described for example in U. S. Patent No. 2,629,722. Because of the difficulties encountered with the Bollman type extractor, this gossypol removal cannot be undertaken by cooking of the meats prior to extraction. Relatively high gossypol solvent extracted meals, therefore, are produced in this type of operation.

Recently the U. S. Government has announced development of a process termed "The Filtration Extraction Process." This process was fashioned in accompaniment with the above cooking process of U. S. Patent No. 2,629,722 to make it possible to directly extract cooked cottonseed meats. This process, however, necessitates the use of a special continuous filter for separation of oil from the total solid protein meat particle mass and for washing of oil from these extracted meat particles. By the use of the extractor according to the present invention, cooked cottonseed meats may be efficiently solvent extracted without the necessity of using special and troublesome filtration equipment for removal of fines from the miscellas, as well as for the separation of oil and solvent from the total solid protein fraction.

Cottonseed meats rolled to approximately .015" thickness were cooked at the rate of 65 pounds per hour at 190° F. with a total moisture content of 13%. These meats, after cooking, were dried to 9% moisture content and re-rolled to flatten the small agglomerations of meats that occurred during the cooking process. The cooked and rolled cottonseed meats at a rate of 65 pounds per hour were directly conveyed to an extractor according to this invention, as shown in Figure 1. The extracted meal issuing from the drainage chamber 24, Figure 1, was desolventized in standard desolventizing equipment. Upon analysis, this meal contained .24% residual oil and .04% free gossypol. The miscella issuing from the settling chamber 16, Figure 1, contained approximately .3% fines, was filtered directly through a simple leaf filter and freed of solvent by evaporation. In general practice, the miscella is stripped of its solvent in an evaporator and stripping column.

By the above illustrations, it is apparent that the extractor according to the present invention is specifically designed for the extraction of finely divided materials or for the extraction of materials which, when coming into contact with the extraction solvent, decompose into many fines. It furnishes the advantages of submerged, mildly agitated extractions, and obviates the necessity of special troublesome filters for removal of fines from the miscella leaving the extraction unit. Although the above examples have demonstrated the operation of the extractor of the present invention to be applicable on materials of a very finely divided nature, this extractor, of course, readily lends itself to the extraction of oil from other materials, such as soybean flakes, granulated prepress cakes, rolled and cooked flax, and other vegetable, nut, animal and plant materials.

What is claimed is:

1. Apparatus for the extraction of soluble fractions by means of a solvent liquid from material containing such fractions, comprising a first horizontal extraction chamber of length exceeding its width, material moving means extending longitudinally in said chamber adapted to move comminuted solid material throughout the length of said chamber, means for admitting solvent liquid to said chamber and for causing it to flow concurrently with said moving material, a settling tank adjacent the end of said chamber towards which the solvent liquid is flowing, said settling tank having liquid and solid flow communication with said chamber, a second horizontal extraction chamber, means for receiving solid material from said first extraction chamber and conveying it into said second extraction chamber, material moving means extending longitudinally through said second extraction chamber, means for admitting solvent liquid to said second extraction chamber in counterflow relationship to the material moving therethrough, a second settling tank at the end of said second extraction chamber towards which said last named solvent liquid is flowing, means for causing flow of said last named solvent liquid into said second settling tank, means for recycling clarified liquid from said second settling tank and injecting it into said first extraction chamber, means for returning settled fines from said second settling tank back into said second extraction chamber, means for heating said clarified liquid before it enters said first extraction chamber, and means for withdrawing from said first settling tank solvent liquid containing soluble fractions in solution therein.

2. Apparatus for the extraction of soluble fractions by means of solvent liquid from material containing such fractions, comprising a horizontal extraction chamber of length exceeding its width, material moving means extending longitudinally in said chamber adapted to move solid comminuted material towards a first end of said chamber, means for admitting solvent liquid adjacent said first end and producing flow thereof towards a second end of said chamber in counterflow relationship to the movement of said solid material, a settling tank at said second end of said extraction chamber in liquid and solid flow communication with said extraction chamber, an extension portion of said material moving means extending into the lower portion of said settling tank whereby to return settled solid material from said tank to said extraction chamber, means for adding extractable solid material to said extraction chamber near said second end thereof, turbulence reducing means in said settling tank for discharging from said settling tank clarified solvent containing the aforesaid soluble fractions, said material moving means including a rotatable shaft, helical screw means on said shaft near one end thereof, other helical screw means on said shaft near the other end thereof, the intermediate portion of said shaft carrying thereon material moving and advancing means including a plurality of helically spaced arms extending outwardly from said shaft and each arm having an angularly inclined impeller paddle at its outer end.

3. Apparatus as defined in claim 2 wherein said impeller paddle is inclined to said shaft at an angle substantially identical to the helix angle of said screw flights.

4. Apparatus for the extraction of soluble fractions by means of a solvent liquid from material containing such fractions, comprising a horizontal extraction chamber of length exceeding its width, material moving means extending longitudinally in said chamber adapted to move solid comminuted material towards a first end of said chamber, means for admitting solvent liquid adjacent said first end and producing flow thereof towards a second end of said chamber in counterflow relationship to the movement of said solid material, a settling tank at said second end of said extraction chamber in liquid and solid flow communication with said extraction chamber, an extension portion of said material moving means extending into the lower portion of said settling tank whereby to return settled solid material from said tank to said extraction chamber, means for adding extractable solid material to said extraction chamber near said second end thereof, turbulence reducing means in said settling tank for discharging from said settling tank clarified solvent containing the aforesaid soluble fractions, said settling tank comprising a central settling chamber and a discharge chamber separated from said settling chamber by an elongated weir, there being liquid flow communication between said central chamber and said discharge chamber over the top of said weir, said material moving means extending along the bottom of said settling chamber.

5. Apparatus for the extraction of soluble fractions by means of a solvent liquid from material containing such fractions, comprising a horizontal extraction chamber of length exceeding its width, material moving means extending longitudinally in said chamber adapted to move solid comminuted material towards a first end of said chamber, means for admitting solvent liquid adjacent said first end and producing flow thereof towards a second end of said chamber in counterflow relationship to the movement of said solid material, a settling tank at said second end of said extraction chamber in liquid and solid flow communication with said extraction chamber, an extension portion of said material moving means extending into the lower portion of said settling tank whereby to return settled solid material from said tank to said extraction chamber, means for adding extractable solid material to said extraction chamber near said second end thereof, turbulence reducing means in said settling tank for discharging from said settling tank clarified solvent containing the aforesaid soluble fractions, said settling tank comprising a central settling chamber and a pair of discharge chambers on opposite sides of said settling chamber, each discharge chamber being separated from said settling chamber by a respective elongated weir, there being liquid flow communication between said settling chamber and said discharge chambers over the tops of said respective weirs.

6. Apparatus as defined in claim 5 wherein the material moving means has an extension along the bottom of said settling chamber.

7. Apparatus for the extraction of soluble fractions by means of a solvent liquid from material containing such fractions, comprising a horizontal extraction chamber of length exceeding its width, material moving means extending longitudinally in said chamber adapted to move solid comminuted material towards a first end of said chamber, means for admitting solvent liquid adjacent said first end and producing flow thereof towards a second end of said chamber in counterflow relationship to the movement of said solid material, a settling tank at said second end of said extraction chamber in liquid and solid flow communication with said extraction chamber, an extension portion of said material moving means extending into the lower portion of said settling tank whereby to return settled solid material from said tank to said extraction chamber, means for adding extractable solid material to said extraction chamber near said second end thereof, turbulence reducing means in said settling tank for discharging from said settling tank clarified solvent containing the aforesaid soluble fractions, said material moving means including a rotatable shaft having helical screw means fixed thereon, and said material lifting means being carried on the transverse faces of said screw flights.

8. Apparatus as defined in claim 7 wherein a plurality of material lifting plates are attached to the transverse faces of said screw flights, some of said plates differing from some others in their respective angles of inclination to the common axis of rotation of said screw flights.

References Cited in the file of this patent
UNITED STATES PATENTS

| | | |
|---|---|---|
| 979,362 | Wiegand | Dec. 20, 1910 |
| 1,081,949 | Du Pont | Dec. 23, 1913 |
| 2,405,105 | Kennedy | July 30, 1946 |
| 2,447,845 | Dinley | Aug. 24, 1948 |
| 2,554,109 | Langhurst | May 22, 1951 |
| 2,619,024 | Flosdorf et al. | Nov. 25, 1952 |
| 2,637,666 | Langen | May 5, 1953 |